(12) United States Patent
Kvieska et al.

(10) Patent No.: US 12,479,429 B2
(45) Date of Patent: Nov. 25, 2025

(54) METHOD FOR AUTOMATICALLY MANAGING THE LONGITUDINAL SPEED OF A VEHICLE

(71) Applicant: RENAULT S.A.S, Boulogne Billancourt (FR)

(72) Inventors: Pedro Kvieska, Versailles (FR); Guillermo Pita-Gil, Versailles (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 215 days.

(21) Appl. No.: 18/042,247

(22) PCT Filed: Jul. 21, 2021

(86) PCT No.: PCT/EP2021/070451
§ 371 (c)(1),
(2) Date: Feb. 20, 2023

(87) PCT Pub. No.: WO2022/042958
PCT Pub. Date: Mar. 3, 2022

(65) Prior Publication Data
US 2023/0331224 A1    Oct. 19, 2023

(30) Foreign Application Priority Data

Aug. 24, 2020 (FR) ..................... 20 08648

(51) Int. Cl.
*B60W 30/14* (2006.01)
*B60W 40/04* (2006.01)
(52) U.S. Cl.
CPC .......... *B60W 30/143* (2013.01); *B60W 40/04* (2013.01); *B60W 2552/10* (2020.02);
(Continued)

(58) Field of Classification Search
CPC .............. B60W 30/143; B60W 40/04; B60W 2552/10; B60W 2552/53;
(Continued)

(56) References Cited

U.S. PATENT DOCUMENTS 9,272,711 B1 * 3/2016 Sivaraman ............. G08G 1/161
10,766,489 B2 * 9/2020 Tuncali ............... B60W 30/165
(Continued)

FOREIGN PATENT DOCUMENTS

CN    111273675 A  *  6/2020
DE    102016012531 A1 * 5/2017  ............ B60W 10/06
(Continued)

OTHER PUBLICATIONS

Machine Translation: KR-20150042479-A (Year: 2015).*
(Continued)

*Primary Examiner* — Anne Marie Antonucci
*Assistant Examiner* — Connor L Knight
(74) *Attorney, Agent, or Firm* — Oblon, McClelland, Maier & Neustadt, L.L.P.

(57) ABSTRACT

A method for managing the longitudinal speed of a vehicle includes detecting vehicles in traffic surrounding the first vehicle and calculating reference speeds of the vehicles. The method further includes calculating a maximum and minimum speed setpoint based on the reference speeds and calculating a speed setpoint of the vehicle that is between or equal to the maximum and minimum speed setpoints.

19 Claims, 4 Drawing Sheets

(52) U.S. Cl.
CPC ............... *B60W 2552/53* (2020.02); *B60W 2554/4041* (2020.02); *B60W 2554/4042* (2020.02); *B60W 2554/4045* (2020.02); *B60W 2720/10* (2013.01)

(58) Field of Classification Search
CPC ............ B60W 2554/4041; B60W 2554/4042; B60W 2554/4045; B60W 2720/10; B60W 2554/804; B60W 40/02; G06F 9/06
See application file for complete search history.

(56) References Cited

U.S. PATENT DOCUMENTS

| | | | | |
|---|---|---|---|---|
| 11,505,210 | B2* | 11/2022 | Mielenz | B60W 30/17 |
| 2013/0116909 | A1* | 5/2013 | Shida | G08G 1/16 |
| | | | | 701/96 |
| 2013/0184926 | A1* | 7/2013 | Spero | B60W 30/143 |
| | | | | 701/25 |
| 2013/0297196 | A1* | 11/2013 | Shida | B60W 30/143 |
| | | | | 701/119 |
| 2016/0159350 | A1* | 6/2016 | Pilutti | B60W 30/143 |
| | | | | 701/23 |
| 2018/0022349 | A1* | 1/2018 | Fairgrieve | B22D 21/005 |
| | | | | 701/93 |
| 2019/0344787 | A1* | 11/2019 | Pietzsch | G06T 7/73 |
| 2019/0382018 | A1* | 12/2019 | Garnault | B60W 30/18163 |
| 2020/0130689 | A1* | 4/2020 | Hanslik | G08G 1/096791 |
| 2023/0073287 | A1* | 3/2023 | Iba | B60W 30/188 |
| 2023/0159035 | A1* | 5/2023 | Tanaka | B60W 50/0097 |
| | | | | 701/70 |

FOREIGN PATENT DOCUMENTS

| | | |
|---|---|---|
| DE | 10 2016 213 660 A1 | 2/2018 |
| KR | 20150042479 A * | 4/2015 |
| WO | WO-2019013694 A1 * | 1/2019 |

OTHER PUBLICATIONS

Machine Translation: DE-102016012531-A1 (Year: 2017).*
Machine Translation: CN-111273675-A (Year: 2020).*
International Search Report issued Oct. 22, 2021 in PCT/EP2021/070451, filed on Jul. 21, 2021, 2 pages.
French Preliminary Search Report issued May 6, 2021 in French Application 20 08648, filed on Aug. 24, 2020, 3 pages (with English translation of Categories of Cited Documents).

* cited by examiner

METHOD FOR AUTOMATICALLY MANAGING THE LONGITUDINAL SPEED OF A VEHICLE

The invention relates to a method for the automated management of the longitudinal speed of a vehicle. The invention further relates to a device for the automated management of the longitudinal speed of a vehicle. The invention also relates to a computer program implementing the mentioned method. The invention relates lastly to a recording medium on which such a program is recorded.

Driving assistance technologies are becoming increasingly widespread and are no longer limited to high-specification vehicles.

These technologies make it possible to simplify the driving of motor vehicles and/or to make the behavior of the drivers of the vehicles more reliable. Documents DE102016213660, US20130297196, US20160159350 and U.S. Pat. No. 9,272,711 illustrate such technologies.

Some automated speed management systems are commonly installed in modern vehicles, these generally operating on the basis of regulating distance between the vehicle fitted therewith, also called first vehicle, and the vehicle in front thereof in its traffic lane, called target vehicle or more simply target.

These automated speed management systems do not make it possible to achieve fluid and safe integration into surrounding traffic. The safety distances with the surrounding vehicles are thus not always optimum and the vehicle may experience sudden accelerations or braking operations, impacting the comfort and the feeling of safety for the passengers in the vehicle.

The aim of the invention is to provide a system and a method for the automated management of the longitudinal speed of a vehicle that rectifies the abovementioned drawbacks.

A first subject of the invention is a method for managing longitudinal speed that produces a comfortable and reassuring regulation for the passengers in the vehicle.

To this end, the invention relates to a method for managing the longitudinal speed of a first vehicle. The method comprises the following steps:
- a step of detecting vehicles in surrounding traffic, the first vehicle comprising detecting at least one vehicle in front of the first vehicle and at least one vehicle behind the first vehicle,
- a step of computing reference speeds, comprising computing at least a first reference speed on the basis of the at least one vehicle in front of the first vehicle and computing at least a second reference speed on the basis of the at least one vehicle behind the first vehicle,
- a step of computing a maximum speed setpoint on the basis of the first reference speed,
- a step of computing a minimum speed setpoint on the basis of the second reference speed,
- a step of computing a speed setpoint for the first vehicle, the speed setpoint for the first vehicle being less than or equal to said maximum speed setpoint and greater than or equal to said minimum speed setpoint.

The detection step may comprise detecting at least two vehicles in front of the first vehicle, said step of computing reference speeds comprising computing reference speeds associated with each of the vehicles detected in front of the first vehicle, the maximum speed setpoint being equal to the minimum of the reference speeds associated with each of the vehicles detected in front of the first vehicle.

As an alternative or in addition, the detection step may comprise detecting at least two vehicles behind the first vehicle, said step of computing reference speeds comprising computing reference speeds associated with each of the vehicles detected behind the first vehicle, the minimum speed setpoint being equal to the maximum of the reference speeds associated with each of the vehicles detected behind the first vehicle.

At least one vehicle from among the vehicles detected in the traffic surrounding the first vehicle may be traveling in a traffic lane adjacent to a traffic lane of the first vehicle, and the detection step may comprise a sub-step of evaluating a risk of said at least one vehicle traveling in the adjacent traffic lane intruding into the traffic lane of the first vehicle.

The adjacent traffic lane may be an entry lane into the traffic lane of the first vehicle.

The sub-step of evaluating the risk of said at least one vehicle intruding into the traffic lane of the first vehicle may comprise:
- computing a time to crossing, by said at least one vehicle traveling in the adjacent traffic lane, of a demarcation line situated between said adjacent traffic lane and the traffic lane of the first vehicle, and
- comparing the time to crossing with a predefined threshold.

The method may comprise:
- a step of receiving a pace setpoint issued by a driver of the first vehicle, and then
- a step of comparing the pace setpoint with the maximum speed setpoint and with the minimum speed setpoint, If the pace setpoint is greater than or equal to the minimum speed setpoint and less than or equal to the maximum speed setpoint, then the longitudinal speed setpoint for the first vehicle may be equal to the pace setpoint.

If the pace setpoint is strictly greater than the maximum speed setpoint, then the speed setpoint for the first vehicle may be equal to the maximum speed setpoint.

If the pace setpoint is strictly less than the minimum speed setpoint, then the speed setpoint for the first vehicle may be equal to the minimum speed setpoint.

The management method may comprise a step of comparing the maximum speed setpoint and the minimum speed setpoint.
- if the minimum speed setpoint is less than or equal to the maximum speed setpoint, then the speed setpoint for the first vehicle may be less than or equal to said maximum speed setpoint and greater than or equal to said minimum speed setpoint,
- if the minimum speed setpoint is strictly greater than the maximum speed setpoint, then the speed setpoint for the first vehicle may be equal to the maximum speed setpoint.

The management method may comprise a step of warning the vehicles surrounding the first vehicle if the minimum speed setpoint is strictly greater than the maximum speed setpoint.

The warning step may comprise activating the brake lights of the first vehicle, and/or activating the hazard lights of the first vehicle, and/or activating a horn of the first vehicle.

The reference speed associated with a vehicle detected in the environment of the first vehicle may be equal to the speed at which the first vehicle should move in order to maintain a predefined following time with said detected vehicle.

All of the reference longitudinal speeds may be computed using the same method.

The invention also relates to a system for the automated management of the longitudinal speed of a vehicle comprising a means for detecting vehicles, the system comprising hardware and/or software elements implementing a method as defined above.

The invention also relates to a motor vehicle comprising an automated management system as defined above.

The invention also relates to a computer program product comprising program code instructions recorded on a computer-readable medium for implementing the steps of the management method defined above when said program is run on a computer, or computer program product able to be downloaded from a communication network and/or recorded on a computer-readable and/or computer-executable data medium, characterized in that it comprises instructions that, when the program is executed by the computer, prompt said computer to implement the management method defined above.

The invention also relates to a computer-readable data recording medium on which is recorded a computer program comprising program code instructions for implementing the management method defined above, or computer-readable recording medium comprising instructions that, when they are executed by a computer, prompt said computer to implement the management method defined above.

The invention also relates to a signal from a data medium carrying the computer program product defined above.

The appended drawing shows, by way of example, one embodiment of a device for the automated management of longitudinal speed according to the invention and one mode of execution of a method for the automated management of longitudinal speed according to the invention.

FIG. 1 schematically shows one embodiment of a vehicle equipped with a means for implementing a method for the automated management of the longitudinal speed of a motor vehicle.

FIG. 2 schematically shows a first traffic configuration taken into account by the method for managing the longitudinal speed of a motor vehicle.

FIG. 3 schematically shows a second traffic configuration taken into account by the method for managing the longitudinal speed of a motor vehicle.

Figure 6:
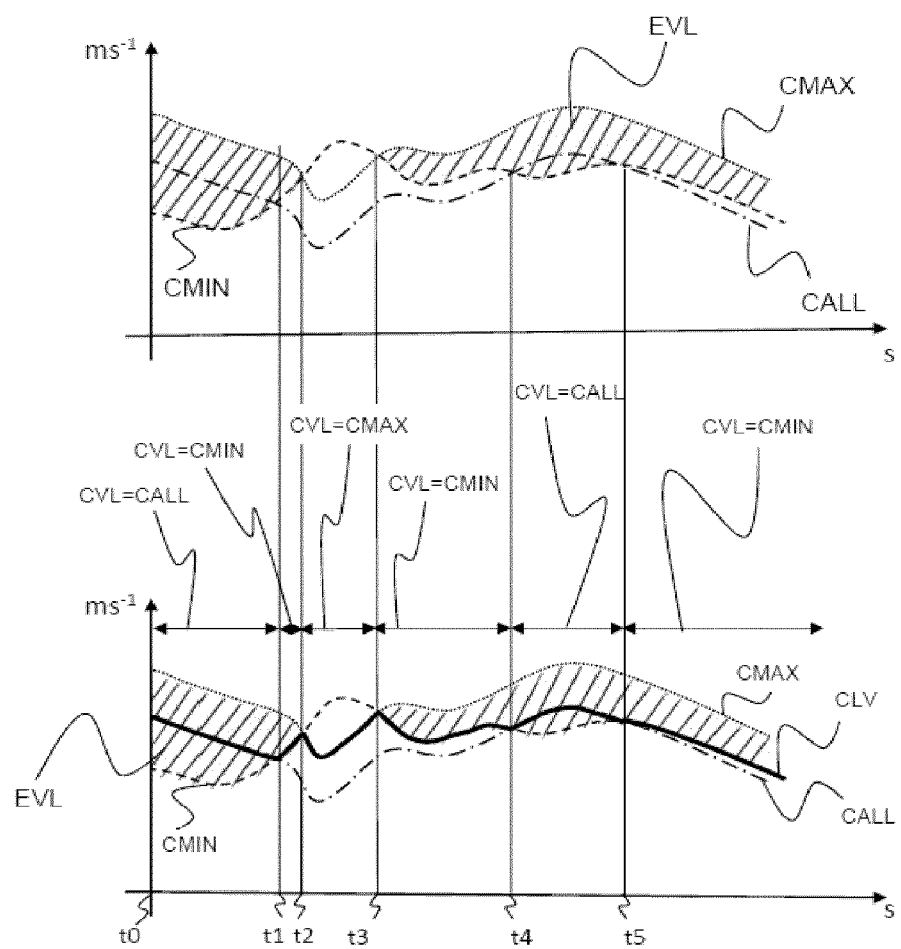

FIG. 6 schematically shows the envelope of possible values for the longitudinal speed setpoint applied to the first vehicle, according to one embodiment of the invention.

Figure 1:
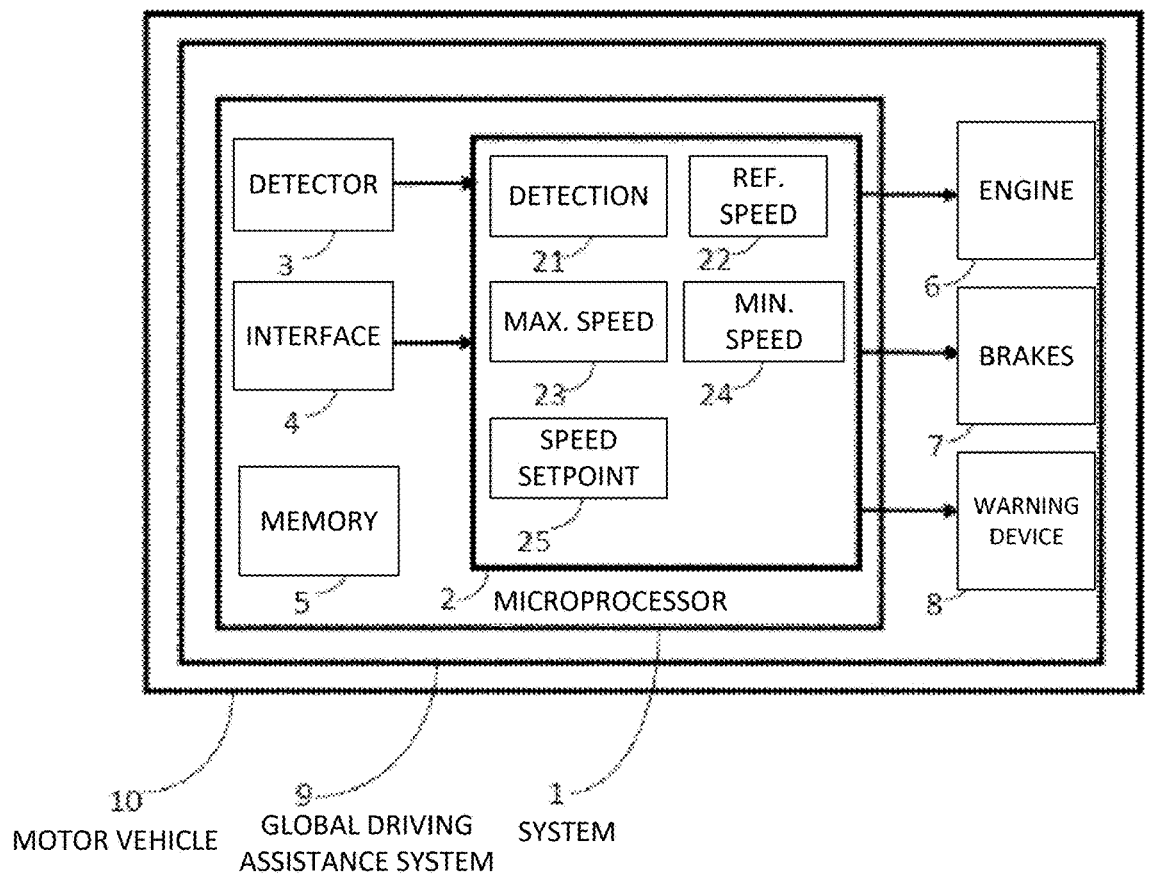

One embodiment of a vehicle equipped with a means for implementing a method for the automated management of longitudinal speed is described below with reference to FIG. 1.

The motor vehicle 10 is a motor vehicle of any type, in particular a passenger vehicle or a utility vehicle. In this document, the vehicle comprising the means for implementing the invention is called "ego" vehicle or first vehicle. These names make it possible only to distinguish it from other surrounding vehicles and do not confer any technical limitation per se on the motor vehicle 10.

The motor vehicle 10 or ego vehicle 10 or first vehicle comprises a system 1 for the automated management of the longitudinal speed of a motor vehicle.

The system 1 for the automated management of the longitudinal speed of a motor vehicle may form part of a more global driving assistance system 9.

In the rest of the document, target vehicle denotes a vehicle situated in the traffic surrounding the ego vehicle 10, the trajectory parameters of which (including position and speed) are taken into account when computing the setpoint longitudinal speed of the ego vehicle.

A target vehicle may be a motor vehicle of any type, in particular a passenger vehicle or a utility vehicle or even a motorcycle.

The system 1 for the automated management of the longitudinal speed of a motor vehicle comprises primarily the following elements:
- a means 3 for detecting vehicles traveling in the lane of the motor vehicle 10, called main lane, and in the traffic lanes, called adjacent lanes, situated on either side of the main lane,
- a human-machine interface 4 allowing the driver of the vehicle to issue a pace setpoint involved in the computing of the speed setpoint for the ego vehicle,
- a microprocessor 2,
- a memory 5.

The system 1 for the automated management of the longitudinal speed of a motor vehicle, and particularly the microprocessor 2, comprises primarily the following modules:
- a module 21 for detecting at least two target vehicles in the traffic surrounding the ego vehicle, this module being able to interact with the detection means 3,
- a module 22 for computing a reference longitudinal speed associated with each of said target vehicles,
- a module 23 for computing a maximum longitudinal speed setpoint for the ego vehicle on the basis of said reference longitudinal speeds,
- a module 24 for computing a minimum longitudinal speed setpoint for the ego vehicle on the basis of said reference longitudinal speeds,
- a module 25 for computing a longitudinal speed setpoint for the ego vehicle on the basis of said maximum and minimum longitudinal speed setpoints and a pace setpoint issued by the driver of the vehicle, this module being able to interact with the human-machine interface 4.

The motor vehicle 10, in particular the system 1 for the automated management of the longitudinal speed of a motor vehicle, preferably comprises all of the hardware and/or software elements configured so as to implement the method defined in the claims and/or the method described below.

The detection means 3 may comprise for example a radar, and/or a lidar, and/or a camera and/or any other type of sensor suitable for detecting targets in the environment of the ego vehicle.

The detection means 3 may provide measurements to the microprocessor 2, including:
- the longitudinal distance between the ego vehicle and the surrounding vehicles,
- the longitudinal and lateral speeds of the surrounding vehicles,
- the longitudinal and lateral acceleration of the surrounding vehicles, and
- the relative longitudinal speed of the surrounding vehicles with respect to the ego vehicle.

The microprocessor 2 may furthermore also receive information relating to the longitudinal speed of the ego vehicle, for example by way of speed sensors of the ego vehicle connected to the system 1. The microprocessor 2 may also receive information relating to the lateral distance between the ego vehicle and surrounding vehicles and/or information for positioning the ego vehicle in a reference frame, in particular for positioning the ego vehicle with respect to demarcation lines.

The module 25 for computing a longitudinal speed setpoint is able to transmit control orders to an engine 6 or to a braking system 7 of the vehicle so as to control the longitudinal speed of the ego vehicle.

The module 25 for computing a longitudinal speed setpoint is able to transmit control orders to a visual warning device or horn 8.

The system 1 for the automated management of the longitudinal speed of a motor vehicle comprises a memory 5. The memory 5 constitutes a recording medium able to be read by a computer or by the processor, comprising instructions that, when they are executed by the computer or the processor, prompt same to implement the method defined in the claims or the method described below.

Figure 2:
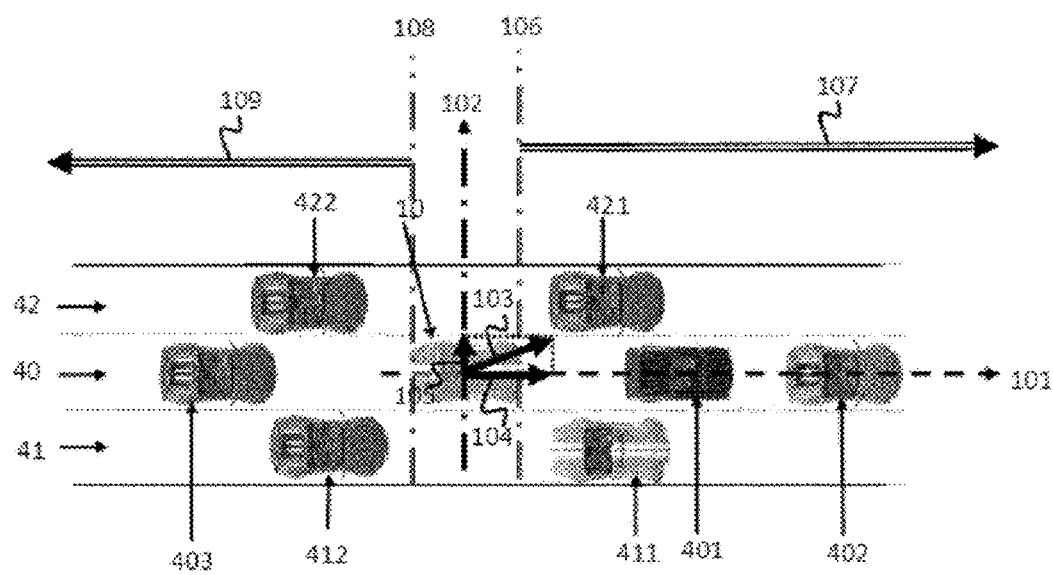

With reference to FIG. 2, it is assumed that the motor vehicle 10, called ego vehicle, is traveling on a roadway comprising three traffic lanes in the same direction. The traffic lanes are parallel to one another. As a variant, the invention could also be implemented in a configuration in which the ego vehicle is traveling on a roadway comprising any other number of traffic lanes, in particular a single traffic lane, two traffic lanes, or even four traffic lanes, or even more. The ego vehicle 10 is positioned in the central lane 40, that is to say there is a first traffic lane 41 adjacent to the right of the ego vehicle and a second traffic lane 42 adjacent to the left of the ego vehicle. As a variant, the invention could also be implemented when the ego vehicle is traveling in the traffic lane 41 or 42.

With reference to FIG. 2, a definition is given of the terminology used in the rest of the document:

The axis called the longitudinal axis 101 of the ego vehicle is defined as its longitudinal axis of symmetry, oriented ahead of the vehicle.

The axis called the lateral axis 102 of the ego vehicle perpendicularly intersects the longitudinal axis 101 at a point situated at the center of gravity of the ego vehicle, and it is oriented to the left of the ego vehicle.

The speed vector 103 of the ego vehicle in a projection onto the longitudinal axis 101 defines the longitudinal component 104 of the speed vector, called longitudinal speed.

The speed vector 103 of the ego vehicle in a projection onto the lateral axis 102 defines the lateral component 105 of the speed vector, called lateral speed.

Likewise, a distance between two vehicles may be projected onto the longitudinal and lateral axes, thus defining a longitudinal distance and a lateral distance.

By convention, a vehicle will be considered to be situated in front of the ego vehicle if it is located at least partially (for example to at least 50%) in the hemispace delimited by an axis 106 parallel to the lateral axis 102 and passing through the front end of the front bumpers of the ego vehicle and oriented in the direction of the axis 101. This hemispace therefore corresponds to an area 107 called traffic situated in front of the ego vehicle.

By convention, a vehicle will be considered to be situated behind the ego vehicle if it is located at least partially (for example to at least 50%) in the hemispace delimited by an axis 108 parallel to the lateral axis 102 and passing through the back end of the back bumpers of the ego vehicle and oriented in the direction opposite the axis 101. This hemispace therefore corresponds to an area 109 called traffic situated behind the ego vehicle.

The traffic lane of the ego vehicle 40 is called main lane. The traffic lanes 41 and 42 adjacent to the main lane and situated on either side of this lane are called adjacent lanes.

As a variant, the axis 106, marking the delimitation of the area called the front traffic area 107, may be moved back so as to be able to select targets further upstream in the traffic (that is to say on the sides of the ego vehicle) in order to anticipate potential vehicles in a cut-in or cut-out situation. For example, the axis 106 could be moved back to the back end of the back bumpers of the ego vehicle. A vehicle may also be considered a potential target when it is located for example at least 10% in the front traffic area 107. The method may therefore be implemented taking into account vehicles situated on the sides of the ego vehicle.

The traffic surrounding the ego vehicle 10 comprises seven vehicles 401, 402, 403, 411, 412, 421, 422, called target vehicles.

Out of these vehicles, four are situated in the traffic called traffic in front of the ego vehicle:

A first target vehicle 401 is positioned directly in front of the ego vehicle, in the same traffic lane 40 as the ego vehicle.

A second target vehicle 402 is positioned directly in front of the first target vehicle 401, in the same traffic lane 40 as the ego vehicle.

A third target vehicle 411 is positioned in the adjacent traffic lane 41, to the right of the ego vehicle.

A fourth target vehicle 421 is positioned in the adjacent traffic lane 42, to the left of the ego vehicle.

The other three vehicles are situated in the traffic called traffic behind the ego vehicle:

A fifth target vehicle 403 is positioned directly behind the ego vehicle, in the same traffic lane 40 as the ego vehicle.

A sixth target vehicle 412 is positioned behind the ego vehicle in the adjacent traffic lane 41, to the right of the ego vehicle.

A seventh target vehicle 422 is positioned behind the ego vehicle in the adjacent traffic lane 42, to the left of the ego vehicle.

The method described here based on a configuration in which the traffic surrounding the ego vehicle comprises seven target vehicles could, as a variant, be implemented with any number of target vehicles greater than or equal to two, comprising at least one vehicle situated in front of the ego vehicle and one vehicle situated behind the ego vehicle. For example, the method may be implemented in a situation in which the surrounding traffic comprises only the target vehicles 401 and 403, or only the target vehicles 411 and 412, or else the target vehicle 401 and the target vehicle 422, or else the target vehicle 421 and the target vehicle 403. Moreover, compared to the configuration with seven target vehicles illustrated in FIG. 2, between one and four target vehicles could be eliminated. The surrounding traffic situated in front of the ego vehicle could also comprise five or even more target vehicles. The surrounding traffic situated behind the ego vehicle could also comprise four or even more target vehicles.

Figure 3:
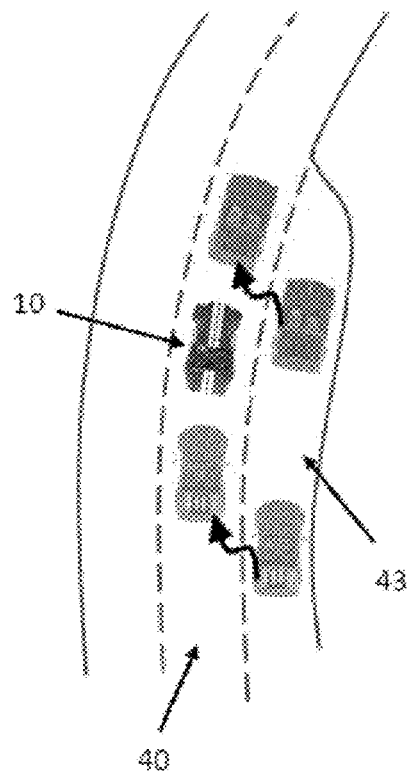
Figure 4:
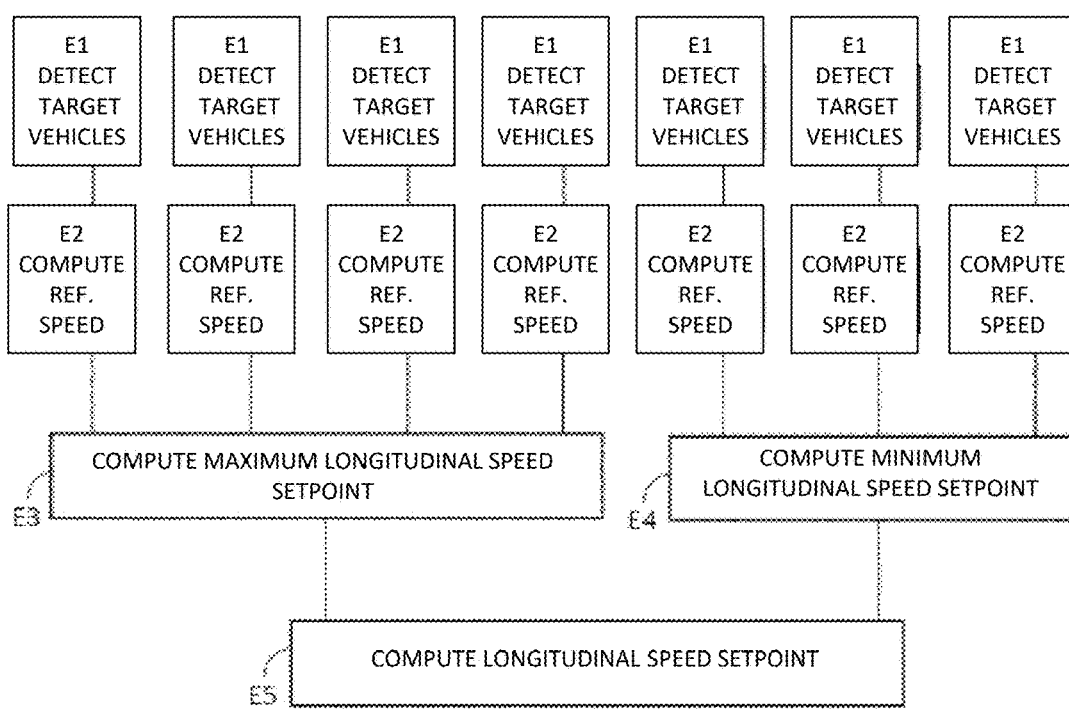
FIG. 4 is a flowchart of one mode of execution of a method for the automated management of the longitudinal speed of a motor vehicle.

One mode of execution of a method for the automated management of longitudinal speed is described below with reference to FIG. 3. The management method may also be seen as being a method for operating a management system or as a method for operating a motor vehicle equipped with a management system. The method comprises five steps E1, E2, E3, E4, E5, which will be described below. As illustrated in FIG. 3, steps E1 and E2 are executed in parallel for each of the target vehicles 401, 402, 403, 411, 412, 421, 422. Each target is therefore processed independently of the others. The following steps E3, E4 and E5 are executed in succession.

In a first step E1, the target vehicles are detected from among the traffic surrounding the ego vehicle.

To this end, the method processes data received from a detection means 3 on board the ego vehicle.

The data from the detection means may make it possible to determine the location of the ego vehicle with respect to the traffic lanes. In particular, they make it possible to determine whether there are traffic lanes 41 and/or 42 adjacent to the main lane 40.

Adjacent lanes may be detected by analyzing ground markings, based on the data received from the detection means 3.

The purpose of taking the adjacent lanes into account when detecting targets is to take into account vehicles that are likely to leave the main lane (called a "cut-out" situation) or merge into the main lane (called a "cut-in" situation).

In a sub-step E11, the risk of a cut-out (pulling-out) situation or a cut-in (merging) situation, or risk of intrusion, associated with a vehicle traveling in an adjacent lane, may be evaluated on the basis of various criteria including:
  a minimum threshold applied to the Time to Line Crossing or TLC of said vehicle, corresponding to the time before said vehicle intrudes into the traffic lane of the ego vehicle in the case of a cut-in, or corresponding to the time before said vehicle pulls out from the traffic lane of the ego vehicle in the case of a cut-out, and/or
  detecting the presence of a flashing light on said vehicle, and/or
  taking into account the lateral speed of said vehicle, and/or
  a minimum threshold applied to the longitudinal and/or lateral distance separating said vehicle from the ego vehicle.

The targets are selected in the area consisting of the main lane 40 and the two adjacent lanes 41 and 42. For each target selected, the method determines whether it is situated in front of or behind the ego vehicle 10.

In one embodiment, the selection criteria for the targets situated in front of the ego vehicle may be the following:
  at least one and at most four targets are selected by the method,
  the targets are selected in the traffic area 107 situated in front of the ego vehicle,
  the targets 401 and 402 are selected in the main lane 40,
  the targets selected in the main lane 40 are the vehicle 401 ahead of the ego vehicle, and the vehicle 402 ahead of the vehicle 401,
  in each of the adjacent lanes 41 and 42, a target is selected, on the proviso that it is detected as being at risk of cut-in.

In addition, in this embodiment, the selection criteria for the targets situated behind the ego vehicle may be the following:
  at least one and at most three targets are selected,
  the targets are selected in the traffic area 108 situated behind the ego vehicle,
  the target 403 following the ego vehicle is selected in the main lane 40,
  in each of the adjacent lanes 41 and 42, a target is selected, on the proviso that it is detected as being at risk of cut-in.

Thus, in the traffic configuration shown in FIG. 2, the first step of the method will automatically identify the vehicles 401, 402, 403 as being targets and will evaluate the risk of intrusion of each of the vehicles 411, 412, 421 and 422 in order to determine whether they constitute targets.

The first step E1 takes into account various configurations regarding the traffic lanes:
  when the number of lanes traveling in the same direction is greater than three, preferably only the at most two lanes adjacent to the main lane are taken into account,
  when the ego vehicle is traveling in the leftmost or rightmost lane of a road, preferably only one adjacent lane is taken into account,
  on single-lane roads, preferably only the three targets situated in the lane called the main lane will be detected.

Advantageously, the first step E1 also takes into account the detection of targets in an entry lane 43, in other words a lane for merging into the traffic lane of the ego vehicle, as illustrated in FIG. 3. Thus, when the ego vehicle is traveling in the slowest lane 41 and travels past an entry lane 43 adjacent to its traffic lane, two target vehicles traveling in the entry lane 43 may be taken into account, one being situated in front of the ego vehicle and the other being situated behind the ego vehicle.

The first step E1 also takes into account the detection of targets on bends. In particular, on a bend, the trajectory of a vehicle traveling in an adjacent lane 41 or 42 may temporarily intersect the longitudinal axis of the ego vehicle, even though this vehicle remains in the lane adjacent to that of the ego vehicle. The method has the ability to analyze this situation in a known manner, such that said vehicle is correctly considered to be traveling in an adjacent lane.

Lane changes performed by vehicles situated in the traffic surrounding the ego vehicle are analyzed dynamically during the execution of the method, in particular when they modify the selection of the targets. For example, if a vehicle 421 moves in between the ego vehicle and the target 401 situated just in front of the ego vehicle, then the vehicle 421 will replace the target 401 and the latter will replace the target 402, which will therefore no longer be taken into account by the method.

During the transitional phase of a lane change performed by a vehicle situated in the traffic surrounding the ego vehicle, the method applies criteria for determining the lane in which a vehicle in the process of crossing a demarcation line is located. These criteria may include the lateral distance of crossing of a demarcation line.

As a variant, one embodiment could process more than seven targets. In a second step E2, for each target selected by step E1, the method computes what is called a reference longitudinal speed. Said reference longitudinal speed associated with a target is the longitudinal speed at which the ego vehicle should move in order to establish and then maintain a following time $T_h$ with said target. For a target situated in front of the ego vehicle 10, the following time $T_h$ corresponds to the time that the ego vehicle—moving at the reference longitudinal speed—would take to reach the position currently occupied by said target. For a target situated behind the ego vehicle 10, the following time $T_h$ corresponds to the time that said target would take to reach the ego vehicle 10—moving at the reference longitudinal speed. The greater the value of the following time $T_h$, the greater the longitudinal distance between the ego vehicle 10 and the target.

A first value of the following time $T_h$ may be set by safety standards, for example 2 seconds: in the rest of the document, this first value is called safe $T_h$ THSEC. In one embodiment, the safe $T_h$ THSEC may depend on the speed of the ego vehicle 10.

A second value of the following time $T_h$ may be set by what is called a driver pace request: in the rest of the document, this second value is called driver $T_h$ THCOND. The pace request set by the driver may for example be defined by three target following levels: a close following level, a moderate following level and a distant following level. Each following level is associated with a driver $T_h$ THCOND value that may additionally depend on speed of the ego vehicle 10. The pace request may be established and viewed via a human-machine interface 4 available on the driver's dashboard. For example, the pace request may be displayed in the form of bars, with three bars corresponding to a distant following pace and a high driver $T_h$ THCOND, two bars corresponding to a moderate following pace and a moderate driver $T_h$ THCOND, and one bar corresponding to a close following pace and a low driver $T_h$ THCOND.

The driver $T_h$ THCOND is preferably greater than or equal to the safe $T_h$ THSEC. As an alternative, the driver may decide to select a THCOND strictly less than the THSEC. In this case, an alarm should warn said driver of the risk entailed by his choice.

In the embodiment described below, the driver does not have the option to select a THCOND strictly less than the THSEC. In other words, the THCOND is greater than or equal to the THSEC.

In a first sub-step E21, the safe $T_h$ THSEC is used to compute the reference longitudinal speed associated with a target. Sub-step E21 makes it possible to associate, with each target, what is called a safe reference longitudinal speed, also called safe reference speed VREFSEC.

For a target situated in front of the ego vehicle 10, the safe reference speed VREFSEC corresponds to a maximum threshold below which the speed of the ego vehicle should be in order to implement a following time for said target greater than or equal to the safe following time THSEC.

For a target situated behind the ego vehicle 10, the safe reference speed VREFSEC corresponds to a minimum threshold above which the speed of the ego vehicle should be in order to implement a following time for said target greater than or equal to the safe following time THSEC.

In this first embodiment, the computing of the safe reference speed VREFSEC associated with a target may integrate a trajectory planning module 80 the role of which is to maintain a substantially constant longitudinal distance between said target and the ego vehicle in steady state.

Figure 5:
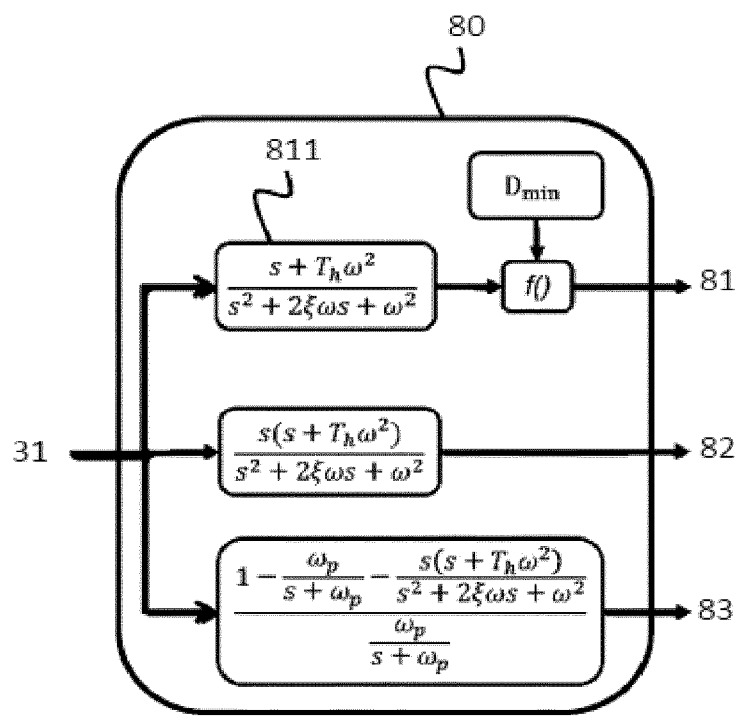
FIG. 5 shows a trajectory planning module.

In one embodiment of the trajectory planning module 80 shown in FIG. 5, second-order servo-control may be used to smooth out any speed variations caused by a target the driving mode of which may be erratic.

In this embodiment, the trajectory planning module 80, one example of which is described in FIG. 5, takes the longitudinal speed 31 of the target at input and produces three parameters at output:
the reference longitudinal distance 81 to be maintained between the ego vehicle and the target,
the reference relative longitudinal speed 82 that the ego vehicle should maintain with respect to the target, and
a pre-servo-control variable 83, called Feedforward.

A method for computing these parameters is illustrated in FIG. 5, in which:
s is the Laplace variable (variable dependent on a frequency),
$\xi$ is the desired damping coefficient for second-order dynamics (dimensionless),
$\omega$ is the undamped natural angular frequency for second-order dynamics (expressed in radians per second),
$\omega_p$ is the time constant of the engine (expressed in radians per second),
$T_h$ is the following time (expressed in seconds); more particularly, in sub-step E21, $T_h$ is equal to the safe following time THSEC,
the function f( ) is a non-linear function that arbitrates between the longitudinal distance computed by a longitudinal distance computing module 811 and a minimum longitudinal distance $D_{min}$, for example, the function f( ) may return the maximum of the two abovementioned longitudinal distances.

In the embodiment described, the reference longitudinal distance 81, the reference relative longitudinal speed 82 and the pre-servo-control variable 83 are then supplied, as input, to what is called a regulation loop, which computes the safe reference speed VREFSEC associated with the target based on these parameters.

Next, in a sub-step E22, the method also computes, for each target situated in front of the ego vehicle, a reference longitudinal speed associated with the driver Th, also called driver reference speed VREFCOND.

For a target situated in front of the ego vehicle 10, the driver reference speed VREFCOND corresponds to a maximum threshold below which the speed of the ego vehicle should be in order to implement a following time for said target greater than or equal to the driver following time THCOND.

Targets situated behind the ego vehicle are not taken into account when computing the driver reference speed VREFCOND.

In this second sub-step E22, the computing of the driver reference speed VREFCOND associated with a target may integrate a trajectory planning module 80 as described above in sub-step E21. The following time Th used in the trajectory planning module is then the driver following time THCOND.

In a third step E3, the maximum longitudinal speed setpoint CMAX for the ego vehicle is computed, making it possible to maintain a given safe following time THSEC between the ego vehicle and all of the targets situated in front of the ego vehicle and identified in step E1.

The computing of the maximum longitudinal speed setpoint CMAX will take into account only targets situated in front of the ego vehicle. The setpoint CMAX will be computed by selecting the minimum speed from among all of the safe reference speeds VREFSEC computed in step E2 for the targets situated in front of the ego vehicle.

In a fourth step E4, the method computes the minimum longitudinal speed setpoint CMIN for the ego vehicle, making it possible to maintain a given safe following time THSEC between the ego vehicle and all of the targets situated behind the ego vehicle and identified in step E1.

The computing of the minimum longitudinal speed setpoint CMIN will take into account only targets situated behind the ego vehicle. The setpoint CMIN will be computed by selecting the maximum speed from among all of the safe reference speeds VREFSEC computed in step E2 for the targets situated behind the ego vehicle.

In a fifth step E5, the method computes the longitudinal speed setpoint CVL for the ego vehicle.

In a first sub-step E51, the maximum longitudinal speed setpoint CMAX is compared with the minimum longitudinal speed setpoint CMIN.

If the maximum longitudinal speed setpoint CMAX is strictly less than the minimum longitudinal speed setpoint CMIN, this means that it is not possible to determine a longitudinal speed setpoint CVL that makes it possible to comply with a safe following time THSEC both with respect to targets situated in front of the ego vehicle and with respect to targets situated behind the ego vehicle. In other words, the most constrictive target speed from among the targets situated behind the ego vehicle is too great in comparison with the most constrictive target speed from among the targets situated in front of the ego vehicle 10. In this case, the longitudinal speed setpoint CVL for the ego vehicle is set at the maximum longitudinal speed setpoint CMAX. This scenario is illustrated in FIG. 6, between the times t2 and t3.

This choice makes it possible to avoid, as a priority, the ego vehicle having an accident with a target situated in front thereof, which would be its responsibility.

In order to limit the risks of an accident with the targets situated behind the ego vehicle, the method commands activation of the brake lights of the ego vehicle, and/or activation of the hazard lights of the ego vehicle, and/or activation of a horn of the ego vehicle.

If the maximum longitudinal speed setpoint CMAX is greater than or equal to the minimum longitudinal speed setpoint CMIN, then, in a sub-step E52, the method computes the pace setpoint CALL that makes it possible to maintain a given driver following time THCOND between the ego vehicle and all of the targets situated in front of the ego vehicle and identified in step E1.

The computing of the pace setpoint CALL will take into account only the targets situated in front of the ego vehicle. The setpoint CALL will be computed by selecting the minimum speed from among all of the driver reference speeds VREFCOND computed in step E2 for the targets situated in front of the ego vehicle.

In a sub-step E53, the driver pace setpoint CALL—computed so as to comply with a following time THCOND determined by the driver of the ego vehicle—is then compared with the minimum and maximum longitudinal speed setpoints CMIN, CMAX, computed so as to comply with a safe following time THSEC with the targets situated in front of and behind the ego vehicle.

The various possible cases are illustrated in FIG. 6:

Between t0 and t1, and then between t4 and t5, the driver pace setpoint CALL is between the minimum speed setpoint CMIN and the maximum speed setpoint CMAX, and the longitudinal speed setpoint for the ego vehicle CVL then takes the value of the driver pace setpoint CALL, Between the times t1 and t2, and then between the times t3 and t4, and then beyond t5, the driver pace setpoint CALL is less than the minimum speed setpoint CMIN, and the longitudinal speed setpoint for the ego vehicle CVL then takes the value CMIN, Between t2 and t3, the minimum speed setpoint CMIN is greater than the maximum speed setpoint CMAX, and the longitudinal speed setpoint for the ego vehicle CVL then takes the value CMAX.

The implementation of the invention thus has the effect of maintaining the longitudinal speed of the ego vehicle within an envelope of longitudinal speeds EVL (shown in FIG. 6). The envelope EVL is defined by applying a safe following time THSEC, with respect to the target vehicles situated in front of, on the one hand, and behind, on the other hand, the ego vehicle, said target vehicles possibly being situated in the traffic lane 40 of the ego vehicle or in the lanes 41, 42 adjacent to those of the ego vehicle.

In the embodiment described, with the following time set by the driver THCOND being greater than or equal to the safe following time THSEC, the longitudinal speed setpoint CALL is situated either within the envelope EVL or below the envelope EVL.

When the driver sets a longitudinal speed setpoint CALL situated within the envelope EVL, then the pace setpoint set by the driver is applied.

When the pace setpoint set by the driver determines a longitudinal speed setpoint CALL situated below the non-empty envelope EVL, then the method will implement the determined maximum longitudinal speed setpoint CMIN by applying the safe following time with respect to the targets situated behind the ego vehicle.

If the envelope EVL is empty, that is to say when it is not possible to implement a safe following time with both the target vehicles situated in front of the ego vehicle and those situated behind the ego vehicle, then the method will implement the determined maximum longitudinal speed setpoint CMAX by applying the safe following time with respect to the targets situated in front of the ego vehicle and will actuate warning means to warn the vehicles situated behind the ego vehicle about the danger.

The invention claimed is:

1. A method for managing a longitudinal speed of a first vehicle to control the first vehicle, the method comprising:
    detecting, via processing circuitry, vehicles in surrounding traffic including at least one vehicle in front of the first vehicle and at least one vehicle behind the first vehicle;
    computing, via the processing circuitry, reference speeds including at least a first reference speed based on the at least one vehicle in front of the first vehicle and at least a second reference speed based on the at least one vehicle behind the first vehicle;
    computing, via the processing circuitry, a maximum speed setpoint based on the first reference speed corresponding to the at least one vehicle in front of the first vehicle, without taking into account the at least one vehicle behind the first vehicle;
    computing, via the processing circuitry, a minimum speed setpoint based on the second reference speed corresponding to the at least one vehicle behind the first vehicle, without taking into account the at least one vehicle in front of the first vehicle;
    computing, via the processing circuitry, a speed setpoint for the first vehicle, the speed setpoint for the first vehicle being less than or equal to said maximum speed setpoint and greater than or equal to said minimum speed setpoint; and
    transmitting, via the processing circuitry, a control signal to the first vehicle to control the longitudinal speed of the first vehicle based on the speed setpoint.

2. The method as claimed in claim 1, wherein said detecting further comprises detecting at least two vehicles in front of the first vehicle, said computing reference speeds further comprises computing reference speeds associated with each of the at least two vehicles detected in front of the first vehicle, the maximum speed setpoint being equal to a minimum of the reference speeds associated with each of the at least two vehicles detected in front of the first vehicle, and/or wherein said detecting further comprises detecting at least two vehicles behind the first vehicle, said computing reference speeds further comprising computing reference speeds associated with each of the at least two vehicles detected behind the first vehicle, the minimum speed setpoint being equal to a maximum of the reference speeds associated with each of the at least two vehicles detected behind the first vehicle.

3. The method as claimed in claim 1, wherein at least one vehicle from among the vehicles detected in the surrounding traffic of the first vehicle is traveling in an adjacent traffic lane adjacent to a traffic lane of the first vehicle, and the detecting further comprises evaluating a risk of said at least one vehicle traveling in the adjacent traffic lane intruding into the traffic lane of the first vehicle.

4. The method as claimed in claim 3, wherein said adjacent traffic lane is an entry lane into the traffic lane of the first vehicle.

5. The method as claimed in claim 4, wherein the evaluating the risk of said at least one vehicle intruding into the traffic lane of the first vehicle comprises:
computing a time to crossing, by said at least one vehicle traveling in the adjacent traffic lane, of a demarcation line situated between said adjacent traffic lane and the traffic lane of the first vehicle, and
comparing the time to crossing with a predefined threshold time corresponding to the risk.

6. The method as claimed in claim 1, further comprising:
receiving a pace setpoint issued by a driver of the first vehicle, and
comparing the pace setpoint with the maximum speed setpoint and with the minimum speed setpoint,
wherein, when the pace setpoint is greater than or equal to the minimum speed setpoint and less than or equal to the maximum speed setpoint, the speed setpoint for the first vehicle is equal to the pace setpoint.

7. The method as claimed in claim 6, wherein, when the pace setpoint is greater than the maximum speed setpoint, the speed setpoint for the first vehicle is equal to the maximum speed setpoint, and/or
when the pace setpoint is less than the minimum speed setpoint, the speed setpoint for the first vehicle is equal to the minimum speed setpoint.

8. The method as claimed in claim 6, wherein
when the pace setpoint is greater than the maximum speed setpoint, the speed setpoint for the first vehicle is equal to the maximum speed setpoint, and
when the pace setpoint is less than the minimum speed setpoint, the speed setpoint for the first vehicle is equal to the minimum speed setpoint.

9. The method as claimed in claim 1, further comprising:
comparing the maximum speed setpoint and the minimum speed setpoint,
wherein:
when the minimum speed setpoint is less than or equal to the maximum speed setpoint, the speed setpoint for the first vehicle is less than or equal to said maximum speed setpoint and greater than or equal to said minimum speed setpoint, and
when the minimum speed setpoint is greater than the maximum speed setpoint, the speed setpoint for the first vehicle is equal to the maximum speed setpoint.

10. The method as claimed in claim 9, further comprising:
warning the vehicles in the surrounding traffic when the minimum speed setpoint is greater than the maximum speed setpoint.

11. The method as claimed in claim 1, wherein a reference speed associated with each vehicle detected in the surrounding traffic of the first vehicle is equal to a speed at which the first vehicle maintains a predefined following time with each detected vehicle.

12. The method of claim 11, further comprising computing, via the processing circuitry, a first reference distance based on the at least one vehicle in front of the first vehicle and the predefined following time and a second reference distance based on the at least one vehicle behind the first vehicle and the predefined following time.

13. The method as claimed in claim 1, wherein all of the reference speeds are computed using the same computation method.

14. The method of claim 1, wherein the computing at least the first reference speed and the second reference speed further comprises computing the first reference speed and the second reference speed based on a second-order control system.

15. The method as claimed in claim 1, wherein said detecting further comprises detecting at least two vehicles in front of the first vehicle, said computing reference speeds further comprises computing reference speeds associated with each of the at least two vehicles detected in front of the first vehicle, the maximum speed setpoint being equal to a minimum of the reference speeds associated with each of the at least two vehicles detected in front of the first vehicle, and
wherein said detecting further comprises detecting at least two vehicles behind the first vehicle, said computing reference speeds further comprising computing reference speeds associated with each of the at least two vehicles detected behind the first vehicle, the minimum speed setpoint being equal to a maximum of the reference speeds associated with each of the at least two vehicles detected behind the first vehicle.

16. A system for automated management of a longitudinal speed of a first vehicle, the system comprising:
processing circuitry configured to
detect vehicles in surrounding traffic including at least one vehicle in front of the first vehicle and at least one vehicle behind the first vehicle,
compute reference speeds including at least a first reference speed based on the at least one vehicle in front of the first vehicle and at least a second reference speed based on the at least one vehicle behind the first vehicle,
compute a maximum speed setpoint based on the first reference speed corresponding to the at least one vehicle in front of the first vehicle, without taking into account the at least one vehicle behind the first vehicle,
compute a minimum speed setpoint based on the second reference speed corresponding to the at least one vehicle behind the first vehicle, without taking into account the at least one vehicle in front of the first vehicle,
compute a speed setpoint for the first vehicle, the speed setpoint for the first vehicle being less than or equal to said maximum speed setpoint and greater than or equal to said minimum speed setpoint, and
transmit a control signal to the first vehicle to control the longitudinal speed of the first vehicle based on the speed setpoint.

17. A motor vehicle comprising:
the system as claimed in claim 16.

18. The system of claim 16, wherein
the processing circuitry is configured to compute at least the first reference speed and the second reference speed based on a second-order control system,
a reference speed associated with each vehicle detected in the surrounding traffic of the first vehicle is equal to a speed at which the first vehicle maintains a predefined following time with each detected vehicle, and
the processing circuitry is further configured to compute a first reference distance based on the at least one vehicle in front of the first vehicle and the predefined following time and a second reference distance based on the at least one vehicle behind the first vehicle and the predefined following time.

19. A non-transitory computer readable medium storing a program that, when executed by a computer, causes the computer to execute a method, the method comprising:
  detecting vehicles in surrounding traffic including at least one vehicle in front of a first vehicle and at least one vehicle behind the first vehicle;
  computing reference speeds including at least a first reference speed based on the at least one vehicle in front of the first vehicle and at least a second reference speed based on the at least one vehicle behind the first vehicle;
  computing a maximum speed setpoint based on the first reference speed corresponding to the at least one vehicle in front of the first vehicle, without taking into account the at least one vehicle behind the first vehicle;
  computing a minimum speed setpoint based on the second reference speed corresponding to the at least one vehicle behind the first vehicle, without taking into account the at least one vehicle in front of the first vehicle;
  computing a speed setpoint for the first vehicle, the speed setpoint for the first vehicle being less than or equal to said maximum speed setpoint and greater than or equal to said minimum speed setpoint; and
  transmitting a control signal to the first vehicle to control a longitudinal speed of the first vehicle based on the speed setpoint.

* * * * *